United States Patent
Sliney, Jr.

(10) Patent No.: US 7,119,956 B1
(45) Date of Patent: Oct. 10, 2006

(54) LIQUID CRYSTAL DISPLAY WITH MIXED POLARIZERS FOR HIGH TEMPERATURE OPERATIONS

(75) Inventor: James G. Sliney, Jr., Robins, IA (US)

(73) Assignee: Rockwell Collins, Inc., Cedar Rapids, IA (US)

(\*) Notice: Subject to any disclaimer, the term of this patent is extended or adjusted under 35 U.S.C. 154(b) by 790 days.

(21) Appl. No.: 09/922,679

(22) Filed: Aug. 6, 2001

(51) Int. Cl.
*G02B 28/21* (2006.01)

(52) U.S. Cl. .................... 359/495; 359/494; 359/500; 359/491

(58) Field of Classification Search ........... 359/158, 359/495, 494, 500, 831, 491, 55, 247; 349/61
See application file for complete search history.

(56) References Cited

U.S. PATENT DOCUMENTS 6,111,696 A \* 8/2000 Allen et al. ............. 359/495

FOREIGN PATENT DOCUMENTS

JP      6230367 A \* 8/1994
JP      6250174 A \* 9/1994

\* cited by examiner

*Primary Examiner*—Carl Whitehead, Jr.
*Assistant Examiner*—Yennhu B. Huynh
(74) *Attorney, Agent, or Firm*—Nathan O. Jensen; Kyle Eppelle

(57) ABSTRACT

A liquid crystal display for use in applications where direct exposure to sunlight creates a thermal gradient from the front of the display to the back of the display uses a high efficiency iodine-type input polarizer and a high temperature type output polarizer. The output polarizer has a higher temperature rating than the input polarizer, so that the thermal gradient does not degrade display performance.

18 Claims, 1 Drawing Sheet

BLOCK DIAGRAM OF MAJOR LCD COMPONENTS

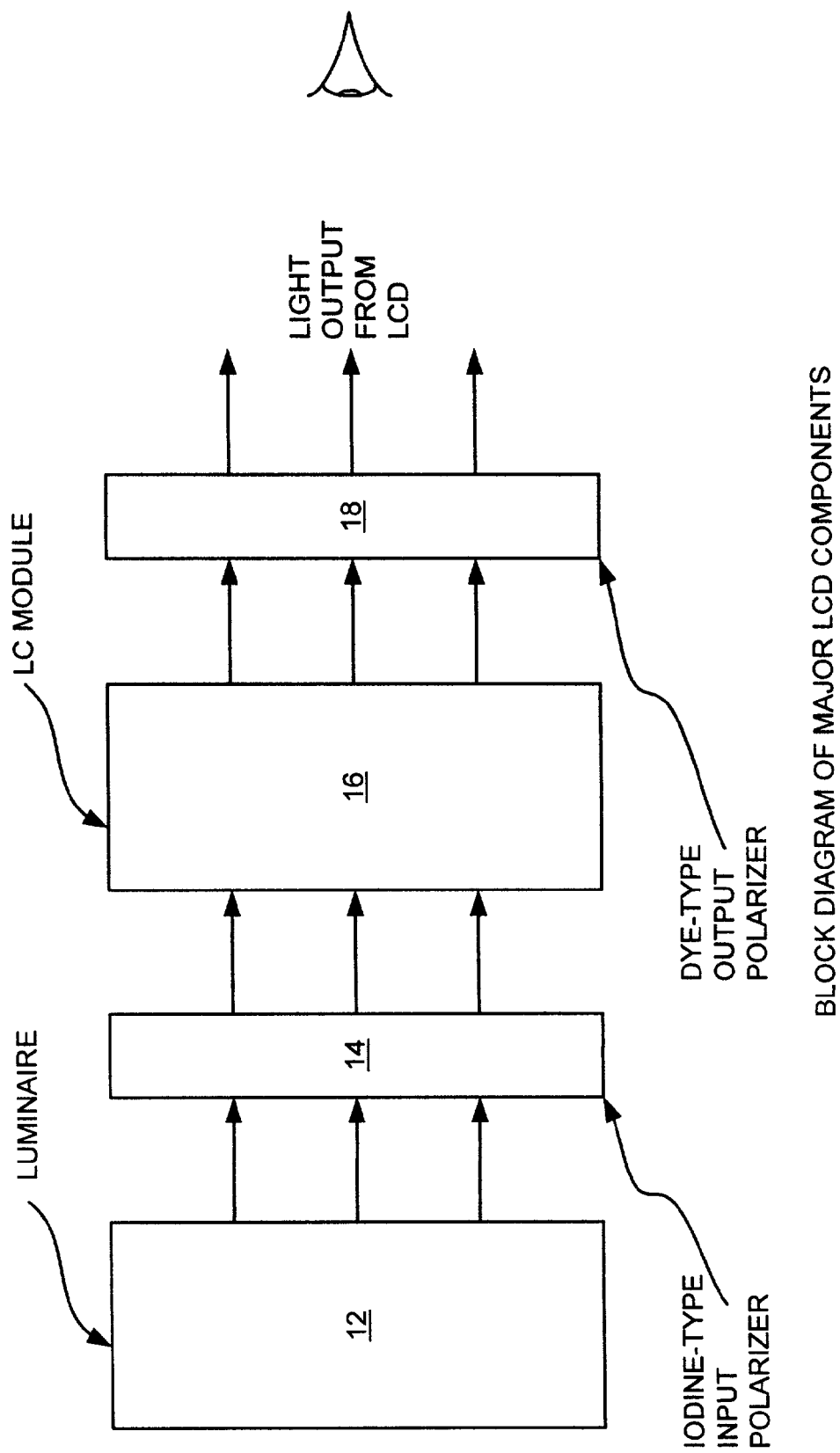

LIQUID CRYSTAL DISPLAY WITH MIXED POLARIZERS FOR HIGH TEMPERATURE OPERATIONS

BACKGROUND OF THE INVENTION

The present invention relates to display devices. In particular, the present invention relates to liquid crystal displays having a input polarizer and an output polarizer, and which have an extended high temperature operating range.

A liquid crystal display typically includes a light source, an input polarizer, a liquid crystal module, and an output polarizer. Light from the light source travels to the input polarizer, which polarizes the light. The polarized light then travels from the input polarizer to the liquid crystal module.

A liquid crystal module includes liquid crystal compositions contained between two substrates. As polarized light passes through the liquid crystal composition, the liquid crystal molecules gradually change the light's plane of vibration to match the angle of the liquid crystal. When the light reaches the exit side of the liquid crystal module, it will vibrate at the same angle as the molecules of the liquid crystal.

Liquid crystal modules operate through the use of matrix arrays of circuits. These matrix arrays allow control over the angle of the liquid crystal molecules at various locations along the array. There are many different variations of matrix arrays. A very efficient and widely used form is found in active matrix displays. Active matrix displays incorporate matrix arrays containing thin film transistors located at each array intersection. Thin film transistors are switching elements that allow distinct control over individual pixels in the matrix. When a particular pixel is to be manipulated, the row where the pixel is located is turned on and a voltage is applied to the column where it is located. Because all of the other rows were turned off, only the given row that is turned on receives the voltage. When the voltage is received by a certain pixel, the liquid crystal molecules change their twist angles in proportion to the voltage and modify the plane of vibration of the incoming light. The light then travels to the output polarizer, whose polarization direction is oriented at 90° to the input polarizer. Based on the angle of rotation of the light polarization while passing though the liquid crystal module, a percentage of the polarized light will pass through the output polarizer.

Because of the need for optimal polarization to obtain an effective liquid crystal display, high efficiency of the input and output polarizers is required. Polarizers absorb part of the light transmitted through the liquid crystal display. A common form of polarizer is a high efficiency iodine-type polarizer, which is well known for its excellent optical performance. High efficiency iodine-type polarizers incorporate long molecular chains of iodine molecules, which are the mechanism for the light absorption. In addition to the iodine molecular chains, iodine-type polarizers are typically composed of several polymeric layers that include materials such as polyvinyl alcohol (PVA) and cellulose triacetate (CTA). The CTA is used on both sides of the PVA layer to protect the iodine molecules in the PVA layer against degradation from exposure to moisture. For special applications, additional protection can be provided against more demanding environments. Such additional protection may include laminating glass sheets over the CTA layers, in order to further encapsulate the polarizer and protect it against environmentally caused degradation. Adhesive layers may also be incorporated to bind multiple layers together.

A common structure of iodine-type polarizer is a film polarizer. A film polarizer includes a stretched layer of a polymeric substrate, such as polyvinyl alcohol. The polymeric substrate such as PVA is stretched along an axis, so that the long molecular iodine chains will align themselves on the surface of the PVA in a direction parallel to the stretched axis. The iodine molecules are absorbed onto the stretched polymeric substrate in the form of long molecular chains. These long molecular chains of iodine, that are oriented parallel to the stretched axis of the PVA, absorb the incoming light that is polarized parallel to the stretched axis. The remaining light, that is transmitted through the iodine type polarizer, is polarized perpendicular to the direction of the stretched axis.

Despite their excellent optical performance, iodine-type polarizers reach a performance limit at about 90° C. Above 90° C., iodine-type polarizers degrade in optical performance, due to a heat driven reaction. Above 90° C., the heat can initiate the break up of the long molecular iodine chains that provide the means for absorbing polarized light. In this process, the polarizer is bleached because it no longer absorbs polarized light. One known mechanism for breaking the molecular iodine chains is water absorption. It has been hypothesized that the breakdown of the iodine molecular chains is due to the release of the residual water molecules in the polyvinyl alcohol substrate.

Avionics is one of the many fields that utilize liquid crystal displays. Avionics liquid crystal displays have made use of high efficiency iodine polarizers for both input and the output polarizers. In certain avionics applications, liquid crystal displays are directly exposed to sunlight, which heats the front of the display. This creates a thermal gradient from the front of the display to the back of the display. As a result of this thermal gradient, the temperature of the output polarizer that is closest to the front of the display is greater than the input polarizer that is closest to the rear of the liquid crystal display. The effect of this is the output polarizer closest to the front of the display can be exposed to temperatures up to about 110° C., while the input polarizer closest to the rear of the liquid crystal display is slightly cooler (about 85–90° C.). Therefore, the input iodine type polarizer at the rear of the display is capable of high performance for a much greater duration than the output iodine type polarizer at the front of the display.

Other high efficiency polarizers are known which have very good optical performance, but not quite as good as the high efficiency iodine type polarizers. A polarizer is needed that can withstand high temperatures up to 110° C. and maintain its optical performance without degradation. This high temperature type polarizer will need to provide optical performance comparable to the current high performance iodine-type polarizers in terms of transmission and efficiency. An example of a high temperature polarizer is the high efficiency dye-type polarizer. Dye-type polarizers are stable at high temperatures, but have lower transmission compared to iodine type polarizers. For example, currently the best iodine type polarizer has a transmission T1=42.7% (Nitto EG 1224DU, for example), while currently the best dye-type polarizer has a T1=39.7% (Sumitomo ST 1822AP, for example). The dye-type polarizer transmits only 93% of the polarized light compared with the Nitto iodine-type polarizers. Using two dye-type polarizers as the input and output polarizers in place of iodine type polarizers would reduce the transmission of polarized light through the liquid crystal display to about 85% compared with the Nitto iodine-type polarizers. Similarly, by using two dye-type polarizers as the input and output polarizers in the cross configuration (i.e., polarization directions of the polarizers oriented at 90° to one another to maximize the extinction of light), the transmission is reduced to 0.02%. With two crossed iodine polarizers, the transmitted light is reduced to 0.01%, which is twice as good as the two crossed dye-type polarizers.

BRIEF SUMMARY OF THE INVENTION

A liquid crystal display which is capable of high performance despite a thermal gradient produced by direct exposure to sunlight includes an iodine type input polarizer and a dye-type or other high temperature-type output polarizer. The dye-type polarizer has a higher temperature rating compared to the iodine type polarizer.

BRIEF DESCRIPTION OF THE DRAWINGS

The Figure is a block diagram illustrating the liquid crystal display of the present invention.

DETAILED DESCRIPTION

The Figure illustrates major components of liquid crystal display 10, which provides higher temperature operation in applications where display 10 is directly exposed to sunlight. Examples of these applications are back-lit cockpit displays in aircraft. The exposure to sunlight can create a thermal gradient in liquid crystal display 10 from the front of the display (closest to the observer) to the back of the display (furthest from the observer).

Liquid crystal display 10 includes a luminaire 12, an iodine-type input polarizer 14, a liquid crystal module 16, and a dye-type output polarizer 18. Luminaire 12 is a light source which back lights liquid crystal module 16.

Unpolarized light from luminaire 12 is polarized in a first polarization direction by iodine-type input polarizer 14. The polarized light passes through liquid crystal module 16 to dye-type output polarizer 18. The polarization direction of dye-type output polarizer 18 is a second direction which is oriented at 90° to the first polarization direction. In other words, input polarizer 14 and output polarizer 18 are oriented in a crossed polarizer configuration.

Liquid crystal module 16 is preferably in an active matrix display that has electrodes or switching elements which are selectively energized to cause selective rotation of the polarization direction of the light received from input polarizer 14 on a pixel basis. If the polarized light is rotated at a particular pixel, it will pass through output polarizer 18 to the observer and the pixel will appear to be lit. In those pixels of liquid crystal module 16 where no rotation occurs, the light passing through those pixels will be blocked by output polarizer 18, and the pixels will appear dark. As a result, a display pattern of light and dark pixels is created.

The optical performance of high efficiency iodine-type polarizers begins to degrade at about 90° C. In contrast, dye-type output polarizers have been found to withstand temperatures of up to about 110° C. without degrading in their optical or mechanical performance. Dye-type polarizers, however, exhibit lower efficiency in that they show only 93% transmission compared with an iodine-type polarizer. In addition, two crossed dye-type polarizers will exhibit greater transmission (leakage) than two crossed iodine polarizers. In the present invention, as illustrated in the Figure, input polarizer 14 is an iodine type polarizer, while output polarizer 18 is a dye-type polarizer. Direct exposure to sunlight can create a temperature gradient across liquid crystal display 10 from front to back so that output polarizer 18 is exposed to temperatures of up to about 110° C. while input polarizer 14 is slightly cooler (about 85–90° C.). Under these conditions, iodine-type input polarizer 14 continues to perform at high efficiency, as does dye-type output polarizer 18. By using different types of polarizers as shown in the Figure, the thermal durability of display 10 is increased without a substantial sacrifice in optical performance.

A dye-type polarizer is used only as output polarizer 18, because the high efficiency dye-type polarizers have optical performance which is somewhat less than that of high efficiency iodine type polarizers. Using dye-type polarizers for both input polarizer 14 and output polarizer 18 would reduce the transmission of light through display 10 to about 85% compared with the use of iodine-type polarizers for both input polarizer 14 and output polarizer 18. By the use of iodine-type input polarizer 14 and dye-type or other high temperature output polarizers 18, the transmission is improved from only 85% to about 93% transmission compared with using two dye-based polarizers. Similarly, the use of two dye-type polarizers in the cross configuration reduces transmission to 0.02%, compared with two crossed iodine polarizers that reduce transmitted light down to 0.01%— which is twice as good. By mixing one of each type of polarizer as shown in the Figure, the cross polarizer transmission is reduced to 0.015%. This is 50% better than using two dye-type cross polarizers.

The combination of iodine-type input polarizer 14 located at the rear of liquid crystal display 10 and dye-type or other high temperature type output polarizer 18 located at the front of the display allows reasonable optical performance combined with greater high temperature durability than has been obtained in the prior art.

Although the present invention has been described with reference to preferred embodiments, workers skilled in the art will recognize that changes may be made in form and detail without departing from the spirit and scope of the invention.

What is claimed is:

1. A liquid crystal display comprising:
   a luminaire;
   an iodine-type input polarizer for polarizing light from the luminaire;
   a liquid crystal module for receiving polarized light from the iodine-type input polarizer; and
   a high temperature type output polarizer for receiving light from the liquid crystal module.

2. The liquid crystal display of claim 1, wherein the input iodine-type polarizer is a film polarizer.

3. The liquid crystal display of claim 1, wherein the high temperature type output polarizer is a film polarizer.

4. The liquid crystal display of claim 1, wherein the iodine-type input polarizer contains an adhesive layer.

5. The liquid crystal display of claim 1, wherein the high temperature type output polarizer contains an adhesive layer.

6. The liquid crystal display of claim 1, wherein the iodine-type input polarizer contains a protective layer.

7. The liquid crystal display of claim 1, wherein the high temperature type output polarizer contains a protective layer.

8. The liquid crystal display of claim 1, wherein the liquid crystal module is an active matrix liquid crystal module.

9. The liquid crystal display of claim 1, wherein the high temperature type output polarizer is a dye-type polarizer.

10. The liquid crystal display of claim 1, wherein the high temperature type output polarizer contains a protective layer.

11. A liquid crystal display comprising:
- a liquid crystal module having a front surface and a rear surface;
- an iodine-type input polarizer adjacent to the rear surface; and
- a dye-type output polarizer adjacent to the front surface.

12. The liquid crystal display of claim 11, wherein the input iodine-type polarizer is a film polarizer.

13. The liquid crystal display of claim 11, wherein the high temperature type output polarizer is a film polarizer.

14. The liquid crystal display of claim 11, wherein the iodine-type input polarizer contains an adhesive layer.

15. The liquid crystal display of claim 11, wherein the high temperature type output polarizer contains an adhesive layer.

16. The liquid crystal display of claim 11, wherein the iodine-type input polarizer contains a protective layer.

17. The liquid crystal display of claim 11, wherein the liquid crystal module is an active matrix liquid crystal module.

18. The liquid crystal display of claim 11, wherein the high temperature type output polarizer is a dye-type polarizer.

* * * * *